United States Patent Office 3,409,512
Patented Nov. 5, 1968

3,409,512
AZEOTROPIC DISTILLATION OF FLUORINATED ETHER AND ACETONITRILE
Louis G. Anello, Basking Ridge, and Richard F. Sweeney, Randolph Township, Morris County, N.J., assignors to Allied Chemical Corporation, New York, N.Y., a corporation of New York
No Drawing. Filed Sept. 27, 1966, Ser. No. 582,258
4 Claims. (Cl. 203—45)

ABSTRACT OF THE DISCLOSURE

Heptafluoroisopropyl, 2′ - iodotetrafluoroethyl ether is separated from acetonitrile by distillation to recover an azeotrope of the ether and acetonitrile having a greater proportion of the ether content than the original mixture. The azeotrope is then water washed to extract the acetonitrile. This separation by azeotropic distillation is particularly useful for separating the fluorinated ether from 1,2-duodotetrafluoroethane and 1 - chloro-2-iodotetrafluoroethane. With these additional by-products present an additional distillation step is provided therefor.

---

This invention relates to an improved process for the separation of heptafluoroisopropyl, 2′-iodotetrafluoroethyl ether from a mixture thereof with acetonitrile. More particularly, this invention relates to an improved process for the recovery of heptafluoroisopropyl, 2′ - iodotetrafluoroethyl ether prepared in a reaction medium containing acetonitrile as solvent and by-product 1,2-diiodotetrafluoroethane.

In copending U.S. patent application 492,276 of Litt et al., filed October 1, 1965, there is disclosed a process for the preparation of heptafluoroisopropyl, 2′-iodotetrafluoroethyl ether by reacting hexafluoroacetone with a metal fluoride such as sodium, potassium, rubidium or cesium fluoride to form a fluorinated organic salt and then reacting this salt with tetrafluoroethylene and iodine to give the desired ether. The reactions involved are illustrated by the following equations in which the metal fluoride is potassium fluoride.

(1)  $(CF_3)_2C=O + KF \rightarrow (CF_3)_2CFOK$ (2)  $(CF_3)_2CFOK + CF_2=CF_2I_2 \rightarrow$
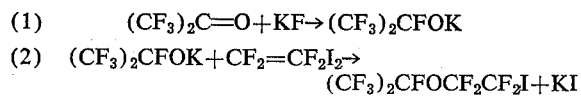
$(CF_3)_2CFOCF_2CF_2I + KI$ During the course of the second reaction 1,2-diiodotetrafluoroethane is formed as a by-product. The reactions are preferably carried out in a liquid medium which is a solvent for the fluorinated organic salt. The liquid medium which has been found to give the best results is acetonitrile, and although the amount of this solvent can be varied, generally at least 4 mols of acetonitrile are present for each mol of ether product produced. However, the boiling point of acetonitrile and heptafluoroisopropyl, 2′-iodotetrafluoroethyl ether are very close, being 82° and 86° C. respectively, and it has been previously believed that it is not possible to effectively separate these two compounds by distillation. Consequently, advantage was taken of the solubility of acetonitrile in water to remove the acetonitrile by washing with large quantities of water. However, this procedure raises two serious problems. First, it is difficult and expensive to recover the acetonitrile from a solution thereof in a large quantity of water. Second, the heptafluoroisopropyl, 2′-iodotetrafluoroethyl ether obtained is contaminated with 1,2 - diiodotetrafluoroethane formed during the reaction, and even after repeated distillations, about 1 to 3% of the product consists of this impurity. When using heptafluoroisopropyl, 2′-iodotetrafluoroethyl ether as an intermediate, the presence of 1,2-diiodotetrafluoroethane interferes with some of the more difficult reactions. For example, the presence of 1,2-diiodotetrafluoroethane interferes with the telomerization of heptafluoroisopropyl, 2′ - iodotetrafluoroethyl ether with tetrafluoroethylene.

It is therefore an object of the present invention to provide a simple and economical process for the separation of heptafluoroisopropyl, 2′-iodotetrafluoroethyl ether from a mixture thereof with acetonitrile.

A further object is to provide a simple and economical process for separating heptafluoroisopropyl, 2′-iodotetrafluoroethyl ether from acetonitrile solvent and 1,2-diiodotetrafluoroethane impurity.

Additional objects and advantages of this invention will be apparent from the following detailed description thereof.

In accordance with the present invention, it has been discovered that heptafluoroisopropyl, 2′ - iodotetrafluoroethyl ether and acetonitrile form an azeotrope having a boiling point of about 69.5° C. and that this azeotrope can be readily separated from excess acetonitrile by fractional distillation. It has been determined by elemental analysis that the azeotrope contains about 1.5 mols of acetonitrile per mol of heptafluoroisopropyl, 2′ - iodotetrafluoroethyl ether. Thus, for example, by fractionally distilling a mixture of 8 mols of acetonitrile and 1 mol of heptafluoroisopropyl, 2′-iodotetrafluoroethyl ether there can be obtained an overhead fraction containing an azeotropic mixture of 1 mol of heptafluoroisopropyl, 2′ - iodotetrafluoroethyl ether and about 1.5 mols of acetonitrile and a residue containing about 6.5 mols of acetonitrile. The heptafluoroisopropyl, 2′ - iodotetrafluoroethyl ether can be recovered from the azeotrope by washing the azeotrope with water to remove the acetonitrile. Further purification can then be effected by additional distillation to obtain a substantially pure product, i.e. at least 99.4% purity. The acetonitrile residue can be reused as solvent either directly or after simple purification. Thus, of the 8 mols of acetonitrile used, 6.5 mols are recovered in the residue in form suitable for recycle and only 1.5 mols are obtained in water solution, from which recovery is difficult and expensive.

In addition to separating out the excess acetonitrile in readily usable form, the above azeotropic distillation also gives a much improved separation of heptafluoroisopropyl, 2′-iodotetrafluoroethyl ether from 1,2-diisodotetrafluoroethane which has a boiling point of about 114° C. This improved separation results from the fact that the heptafluoroisopropyl, 2′ - iodotetrafluoroethyl ether is fractionally distilled from the mixture as an azeotrope boiling at about 69.5° C. making possible a much larger temperature differential from the boiling point of the 1,2 - diiodotetrafluoroethane than can be used when the acetonitrile is first removed and the ether-containing residue then distilled.

The present invention can be employed with mixtures of acetonitrile and heptafluoroisopropyl, 2′-idotetrafluoroethyl ether containing any amount of acetonitrile in excess of that required to form the azeotrope with the ether, but for practical purposes at least 2 mols of acetonitrile should be present for each mol of the ether. In practicing the azeotropic distillation, it is preferred to collect the overhead fraction containing the azeotrope over a temperature range extending from slightly below 69.5° C. to slightly above it. This range can be varied depending on the product purity desired. Preferably a temperature range falling between about 55° to 75° C. is used.

Removing the acetonitrile from the azeotrope by water extraction of course destroys the azeotrope and raises the effective distillation temperature of the remaining heptafluoroisopropyl, 2′ - iodotetrafluoroethyl ether in subsequent fractional distillations to 86° C. Thus contaminants present because their boiling points are close to that of the azeotrope can be separated from the ether by further distillation after the removal of acetonitrile.

In a preferred procedure for preparing the heptafluoroisopropyl, 2' - iodotetrafluoroethyl ether, which is illustrated below in Example 2, iodine monochloride is used in conjunction with the iodine and some 1 - chloro - 2-iodotetrafluoroethane is formed as by-product in addition to 1,2 - diiodotetrafluoroethane This material has a boiling point of 56° C., only 13.2° below that of the azeotrope, and thus is usually present to some extent in the azeotrope-containing fraction. After removing the acetonitrile from the azetotrope, the 1 - chloro - 2 - iodotetrafluoroethane is readily separated from the heptafluoroisopropyl, 2'-iodotetrafluoroethyl ether by fractional distillation.

The heptafluoroisopropyl,2'-iodotetrafluoroethyl ether recovered by the present invention can be used as an intermediate in the preparation of a number of useful products. Fluorinated acids useful as surfactants can be prepared by reacting heptafluoroisopropyl,2'-iodotetrafluoroethyl ether with a Grignard reagent to form a magnesium halide adduct, reacting this adduct with $CO_2$ to form a magnesium halide salt and then acidifying this salt. This procedure is illustrated in Example 6 of copending application 492,276. Also, heptafluoroisopropyl,2'-iodotetrafluoroethyl ether can be reacted with tetrafluoroethylene to give liquid products of the formula $$(CF_3)_2CFO\text{—}CF_2\text{—}CF_2(CF_2CF_2)_nI$$

with $n$ preferably being about 1–10. These liquids are useful as condenser fluids, hydraulic fluids, lubricants, heat transfer media and refrigerants. The reaction with tetrafluoroethylene requires a very pure heptafluoroisopropyl,2'-iodotetrafluoroethyl ether such as obtained by the present invention, the purification procedure of copending application 492,276 being unsatisfactory in this particular case.

The following examples are given to further illustrate the invention, but it is to be understood that the invention is not to be limited in any way by the details described therein. In the examples, parts are by weight.

EXAMPLE 1

A mixture of 106 parts of heptafluoroisopropyl,2'-iodotetrafluoroethyl ether and 91.5 parts of acetonitrile were fractionally distilled through a spinning band column. Fractions were collected as follows:

TABLE

| Fraction | Temperature, ° C. | Parts |
|---|---|---|
| 1 | 69 up to 69.5 | 13.0 |
| 2 | 69.5 | 104.0 |
| 3 | Above 69.5 up to 74 | 7.5 |
| 4 | 74 to 82 | 73.0 |

It was determined by elemental analysis that the constant boiling fraction obtained at 69.5° C. contained about 90.5 parts of heptafluoroisopropyl,2'-iodotetrafluoroethyl ether and that the mol ratio of the ether to acetonitrile in this fraction was about 1:1.5. Additionally, it was determined that the remainder of the ether was present in fractions 1 and 3.

EXAMPLE 2

Into a 3-neck flask equipped with a stirrer, thermometer, −78° C. condenser and gas inlet tube were charged 7830 parts of acetonitrile and 965 parts of anhydrous potassium fluoride. With stirring 2270 parts of hexafluoroacetone was added, followed by the addition of 3510 parts of iodine. Then 2140 parts of iodine monochloride dissolved in 1566 parts of acetonitrile was slowly added while 2590 parts of tetrafluoroethylene was fed into the reaction system. The amount of tetrafluoroethylene absorbed or reacted was 1360 parts.

The −78° C. condenser was replaced by a 36″ lg. x ½″ I.D. distillation column packed with ¼″ glass helices. The desired product $(CF_3)_2CFOCF_2CF_2I$, B.P. 86–87° C., as well as byproduct 1-chloro-2-iodotetrafluoroethane, B.P. 56–57° C. was removed by distillation as a mixture of $CF_2ICF_2Cl$ and $(CF_3)_2CFOCF_2I·CH_3CN$ azeotrope in a boiling range of 55–70° C. There was thus recovered 5019 parts of crude product, as well as 532 parts of unreacted hexafluoroacetone in a −78° C. trap. The acetonitrile which did not distill over as part of the azeotrope and 1,2-diiodotetrafluoroethane by-product remained in the distillation residue.

The crude product was washed with water to remove the water-soluble acetonitrile, dried and redistilled. The distillation was as follows:

| Fraction | Parts | Temperature, ° C. |
|---|---|---|
| 1 | 31 | 46–49 |
| 2 | 32 | 49–54 |
| 3 | 505 | 54–57 |
| 4 | 102 | 57–80 |
| 5 | 11 | 80–84 |
| 6 | 3,155 | 84–88 |
| 7 | 56 | Remainder |

Fraction 3 was identified as $CF_2ICF_2Cl$ by-product and Fractions 6 and 7 were identified as desired $$(CF_3)_2CFOCF_2CF_2I$$

with a yield of 81% of the desired product being obtained. Chromatographic analysis showed the product to be of 99.4% purity.

The procedure of Example 2 can be repeated omitting the iodine monochloride and using more iodine. The yield of desired product is lower but the separation of an azeotrope of acetonitrile and heptafluoroisopropyl,2'-iodotetrafluoroethyl ether from excess acetonitrile by fractional distillation can be carried out in the same manner. When iodine monochloride is not used, by-product 1-chloro-2-iodotetrafluoroethane is not formed.

It will be apparent that many modifications and variations can be effected without departing from the scope of the novel concepts of the present invention, and the illustrative details disclosed are not to be construed as imposing unnecessary limitations on the invention.

We claim:

1. A process for the separation of heptafluoroisopropyl,2'-iodotetrafluoroethyl ether from a mixture containing at least two mols of acetonitrile per mol of heptafluoroisopropyl,2'-iodotetrafluoroethyl ether which comprises fractionally distilling said mixture, recovering an overhead fraction containing an azeotrope of acetonitrile and heptafluoroisopropyl,2' - iodotetrafluoroethyl ether and washing said overhead fraction with water to extract the acetonitrile.

2. A process as claimed in claim 1 wherein said overhead fraction is collected at a temperature within the range of about 55 to 75° C.

3. A process as claimed in claim 1 wherein the mixture also contains 1,2-diiodotetrafluoroethane, said 1,2-diiodotetrafluoroethane remaining in the distillation residue when said overhead fraction is recovered.

4. A process for the separation of heptafluoroisopropyl,2'-iodotetrafluoroethyl ether from a mixture thereof with acetonitrile, 1,2-diiodotetrafluoroethane and 1-chloro-2-iodotetrafluoroethane, at least two mols of acetonitrile being present for each mol of heptafluoroisopropyl,2'-iodotetrafluoroethyl ether, said process comprising fractionally distilling said mixture, recovering an overhead fraction at a temperature in the range of 55° to 75° C. containing an azeotrope of acetonitrile and heptafluoroisopropyl,2'-iodotetrafluoroethyl ether as well as at least a portion of said 1-chloro-2-iodotetrafluoroethane, while leaving the excess acetonitrile which is not required to form the azeotrope and the 1,2-diiodotetrafluoroethane in the distillation residue, washing said overhead fraction with water to extract acetonitrile, and further fractionally distilling the remaining product to separate heptafluoroisopropyl,2'-iodotetrafluoroethyl ether and 1-chloro-2-iodotetrafluoroethane.

No references cited.

WILBUR L. BASCOMB, Jr., *Primary Examiner.*